(12) United States Patent
Kim et al.

(10) Patent No.: US 10,707,463 B2
(45) Date of Patent: Jul. 7, 2020

(54) BATTERY PACK MINIMIZED WITH MOUNTING SPACE FOR DEVICE

(71) Applicant: LG CHEM, LTD., Seoul (KR)

(72) Inventors: Min Sung Kim, Daejeon (KR); Yoon Hee Lee, Daejeon (KR); Hak Jun Lee, Daejeon (KR); Jun Hee Jung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 140 days.

(21) Appl. No.: 15/752,899

(22) PCT Filed: Jan. 6, 2017

(86) PCT No.: PCT/KR2017/000174
§ 371 (c)(1),
(2) Date: Feb. 15, 2018

(87) PCT Pub. No.: WO2017/122967
PCT Pub. Date: Jul. 20, 2017

(65) Prior Publication Data
US 2018/0241021 A1    Aug. 23, 2018

(30) Foreign Application Priority Data
Jan. 12, 2016 (KR) .................. 10-2016-0003598

(51) Int. Cl.
*H01M 2/10* (2006.01)
*H01M 2/08* (2006.01)
(Continued)

(52) U.S. Cl.
CPC ........... *H01M 2/1083* (2013.01); *B60L 50/64* (2019.02); *B60L 50/66* (2019.02); *H01M 2/08* (2013.01);
(Continued)

(58) Field of Classification Search
CPC ......... H01M 2/02–0495; H01M 2/1016–1088; H01M 2220/20
(Continued)

(56) References Cited

U.S. PATENT DOCUMENTS 5,501,289 A    3/1996  Nishikawa et al.
8,110,300 B2   2/2012  Niedzwiecki et al.
(Continued)

FOREIGN PATENT DOCUMENTS

CN    202174924 U    3/2012
CN    103855341 A1   6/2014
(Continued)

OTHER PUBLICATIONS

Extended European Search Report, dated Oct. 26, 2018, for European Application No. 17738596.0.
(Continued)

*Primary Examiner* — Bach T Dinh
(74) *Attorney, Agent, or Firm* — Birch, Stewart, Kolasch & Birch, LLP

(57) ABSTRACT

The present invention provides a battery pack mounted to a battery pack mounting part of a device for supplying power, including: a base plate including one surface on which two or more battery module assemblies respectively having a plurality of battery cells arranged therein are mounted in a separated state from each other with a predetermined interval therebetween; a cover member mounted on one surface of the base plate while enclosing the battery module assemblies; and a reinforcement supporting member positioned at a separation part between the battery module assemblies while supporting the mounting state of the cover member for the base plate, wherein the battery pack is mounted in a state in which an external circumferential surface of the cover member faces a battery pack mounting part of a device.

22 Claims, 5 Drawing Sheets

(51) Int. Cl.
*B60L 50/60* (2019.01)
*B60L 50/64* (2019.01)
*H01M 10/0525* (2010.01)

(52) U.S. Cl.
CPC ........... *H01M 2/10* (2013.01); *H01M 2/1077* (2013.01); *H01M 10/0525* (2013.01); *H01M 2220/20* (2013.01); *Y02E 60/122* (2013.01)

(58) Field of Classification Search
USPC .................................... 429/96–100, 151–177
See application file for complete search history.

(56) References Cited

U.S. PATENT DOCUMENTS

| | | | |
|---|---|---|---|
| 9,012,051 | B2 | 4/2015 | Lee et al. |
| 9,499,068 | B2 | 11/2016 | Yang et al. |
| 2010/0273040 | A1 | 10/2010 | Kubota et al. |
| 2011/0129727 | A1* | 6/2011 | Ahn .................... H01M 2/0207 429/185 |
| 2012/0161472 | A1* | 6/2012 | Rawlinson ............... B60K 1/04 296/187.08 |
| 2012/0312614 | A1* | 12/2012 | Fujiwara ............. H01M 2/1077 180/68.5 |
| 2014/0030563 | A1* | 1/2014 | Hoshi ................. H01M 2/1077 429/72 |
| 2014/0158444 | A1 | 6/2014 | Han et al. |
| 2014/0284125 | A1* | 9/2014 | Katayama ................ B60K 1/04 180/68.5 |
| 2016/0111755 | A1* | 4/2016 | Liu ....................... H01M 4/667 429/152 |
| 2017/0237053 | A1* | 8/2017 | Sugawara ............... H01M 2/10 429/159 |

FOREIGN PATENT DOCUMENTS

| | | |
|---|---|---|
| CN | 104253283 A | 12/2014 |
| CN | 104953055 A | 9/2015 |
| CN | 107949929 A | 4/2018 |
| EP | 2741343 A1 | 6/2014 |
| EP | 2 833 436 B1 | 7/2016 |
| EP | 3333935 A1 | 6/2018 |
| JP | 2008-56194 A | 3/2008 |
| JP | 2009-146795 A | 7/2009 |
| JP | 2012-101663 A | 5/2012 |
| JP | 2013-147137 A | 8/2013 |
| JP | 2013-201112 A | 10/2013 |
| JP | 2014-139937 A | 7/2014 |
| KR | 10-2010-0003138 A | 1/2010 |
| KR | 10-2012-0033181 A | 4/2012 |
| KR | 10-2014-0140678 A | 12/2014 |
| KR | 10-2015-0015179 A | 2/2015 |
| WO | WO 2012/140791 A1 | 10/2012 |

OTHER PUBLICATIONS

International Search Report (PCT/ISA/210) issued in PCT/KR2017/000174, dated Apr. 10, 2017.

* cited by examiner

BATTERY PACK MINIMIZED WITH MOUNTING SPACE FOR DEVICE

FIELD OF THE INVENTION

The present invention relates to a battery pack for a device, having a minimized mounting space.

This application claims priority to and the benefit of Korean Patent Application No. 10-2016-0003598 filed in the Korean Intellectual Property Office on Jan. 12, 2016, the entire contents of which are incorporated herein by reference.

BACKGROUND OF THE INVENTION

Recently, as technology development and demand for mobile devices has been increasing, the demand for rechargeable batteries capable of being charged and discharged as an energy source has been rapidly increasing, and accordingly, a great deal of research on rechargeable batteries that can meet various demands has been conducted. Also, the rechargeable batteries are attracting attention as a power source for electric vehicles (EV), hybrid electric vehicles (HEV), plug-in hybrid electric vehicles (Plug-In HEV), etc. that are presented as a solution to solve air pollution and the like of conventional gasoline vehicles and diesel vehicles using fossil fuels.

Therefore, electric vehicles (EV) that can operate only with a battery, as well as hybrid electric vehicles (HEV) using a battery and a conventional engine, are being developed, and some are commercially available. The rechargeable battery as the power source such as for the EV, the HEV, and the like is generally a nickel metal hydride (Ni-MH) rechargeable battery, and recently, research on lithium secondary batteries with high energy density, high discharge voltage, and good output stability has been actively conducted, and several are in commercialization stages.

When the rechargeable battery is used as the power source of the vehicle, the rechargeable battery is used in a form of a battery pack including a plurality of battery modules in battery module assemblies.

In this case, to use the battery pack as the power source of a device or a system that is exposed to various environments such as the vehicle, it must be able to maintain structural stability with respect to stimuli such as external impacts depending on various environments and ensure the safety of the battery pack at varying humidity and temperature.

Accordingly, several battery packs used as the power source of the vehicles are mounted in an internal space like a part of a seat area from the trunk of the vehicle to easily secure a mounting space and reduce the stimuli due to various factors such as the external impact and humidity.

However, these vehicle battery packs occupy a large portion of the internal space due to their large volume, and there are problems that the trunk space may not be fully utilized and the seat of the vehicle must be reduced.

Therefore, there is a high necessity of a technology capable of fundamentally solving such problems.

The above information disclosed in this Background section is only for enhancement of understanding of the background of the invention and therefore it may contain information that does not form the prior art that is already known in this country to a person of ordinary skill in the art.

DETAILED DESCRIPTION OF THE INVENTION

Technical Problem

An object of the present invention is to solve the problems of the prior art and the technical problems of the past.

The inventors of the present invention performed in-depth research and various experiments, and as a result, confirmed that, as is to be explained later, as an external circumferential surface of a cover member is configured to be mounted in a state of facing a battery pack mounting part of a device, the battery pack may be configured to be mounted under the device such as a vehicle, and accordingly, in the device, the space required for the mounting of the battery pack may be minimized, therein overcoming a limitation for a mounting position of the battery pack and confirming maximization of space utilization of the device, and thereby completed the present invention.

Technical Solution

To achieve the above objects, a battery pack according to the present invention includes, as a battery pack mounted to a battery pack mounting part of a device to supply power, a base plate including one surface on which two or more battery module assemblies respectively having a plurality of battery cells arranged therein are mounted in a separated state from each other with a predetermined interval therebetween;

a cover member mounted on one surface of the base plate while enclosing the battery module assemblies; and a reinforcement supporting member positioned at a separation part between the battery module assemblies while supporting the mounting state of the cover member for the base plate, wherein the battery pack is mounted in a state such that an external circumferential surface of the cover member faces a battery pack mounting part of a device.

Therefore, according to the mounting structure, the battery pack may be configured to be mounted under the device such as a vehicle, and as a result, in the device, as the space required for the mounting of the battery pack is minimized, a limitation for the mounting position of the battery pack may be overcome, and the space utilization of the device may be maximized.

In a specific embodiment, the external circumferential surface of the cover member may be formed of a structure corresponding to a shape of the battery pack mounting part of the device.

Accordingly, the external circumferential surface of the cover member and the battery pack mounting part of the device may be in contact in the state such that areas facing each other are maximized, and accordingly, a binding force of the battery pack for the battery pack mounting part of the device may be improved, and the space required for the mounting of the battery pack is minimized.

The cover member may be formed of a structure in which a part corresponding to a separation space between the battery module assemblies is recessed so that the battery module assemblies are separated from each other.

Accordingly, as each of the battery module assemblies may be stably fixed and maintained by the cover member, the displacement in the battery pack may be suppressed, thereby improving the structural stability.

Particularly, part of the battery pack mounting part is coupled face-to-face to an interior circumference of the part where the cover member is recessed.

In detail, the device to which the battery pack is mounted may be a vehicle, and in this case, the battery pack mounting part may be a lower frame of the vehicle made of a plurality of linear beams.

Accordingly, the part of the lower frame of the vehicle made of the plurality of linear beams may be coupled face-to-face to the interior circumference of the cover member part that is recessed with the shape corresponding to the separation space between battery module assemblies, and accordingly, the battery pack may be prevented from being displaced by the cover member enclosing the battery module assemblies, thereby preventing against damage from an external impact and being stably protected.

Also, because the battery pack mounting part is configured of the frame forming the device, it is not necessary to manufacture a separate battery pack mounting part having a structure corresponding to the external circumferential surface shape of the battery pack, thereby saving overall manufacturing cost and time, and kinds of the entire constituent elements may be reduced, thereby mounting the battery pack with the further simplified structure.

The battery pack may be mounted to the battery pack mounting part by a fastener that is inserted and coupled from the base plate.

As explained above, the battery pack according to the present invention may be the structure in which the external circumferential surface of the cover member is mounted in the state of facing the battery pack mounting part of the device.

Accordingly, as the fastener to be mounted to the battery pack mounting part of the device is inserted and coupled from the base plate facing the cover member, the battery pack may be easily mounted to the battery pack mounting part of the device.

In this case, the fastener may be coupled to the battery pack mounting part through the reinforcement supporting member and the cover member from the base plate.

That is, by one fastener that is inserted and coupled from the base plate, the base plate, the reinforcement supporting member, and the cover member are integrally combined and simultaneously the battery pack may be mounted to the battery pack mounting part of the device, and accordingly, a number of fasteners required for mounting the battery pack may be reduced and simultaneously the entire weight of the battery pack is lowered, thereby improving operation efficiency of the device.

In a specific embodiment, the reinforcement supporting member may be formed of a structure in which a connect beam is connected between at least two supporting parts.

Accordingly, the reinforcement supporting member with a relatively lowered weight and compact size may stably support the mounting state of the cover member for the base plate.

In this case, the supporting parts and the connect beam may be made of an integral structure for improving the structural stability.

Also, a length of the connect beam connected between the supporting parts may be formed of a size of 10% to 30% with reference to the entire length of the reinforcement supporting member.

If the length of the connect beam connected between the supporting parts is formed with a size of less than 10% with reference to the entire length of the reinforcement supporting member, the weight and/or the size may be increased to provide strength required for exerting the supporting force desired for the reinforcement supporting member.

In contrast, If the length of the connect beam connected between the supporting parts is over 30% with reference to the entire length of the reinforcement supporting member, the distance between the supporting parts is excessive such it may not be possible to stably support the mounting state of the cover member for the base plate.

Also, the reinforcement supporting member may be a structure in which both surfaces of the supporting part facing each other are respectively coupled face-to-face to the recessed interior circumference part of the cover member and the separation part of the battery cell assemblies on the base plate.

As above-described, while supporting the mounting state of the cover member for the base plate, the reinforcement supporting member is positioned at the separation part between the battery module assemblies, and in this case, the cover member may be formed of the structure in which the part corresponding to the separation space between the battery module assemblies is recessed to divide the battery module assemblies.

Accordingly, as both surfaces of the supporting part facing each other are respectively coupled face-to-face to the recessed interior circumference part of the cover member and the separation part of the battery cell assemblies on the base plate, the reinforcement supporting member may stably support the mounting state of the cover member for the base plate.

In this case, the supporting part may be a structure in which a first fastening hole where the fastener is coupled to both surfaces that are coupled face-to-face to the cover member and the base plate is formed with a penetrating structure.

Also, a second fastening hole and a third fastening hole may be respectively formed at the part of the cover member corresponding to the first fastening hole of the supporting part and the part of the base plate.

In other words, the first fastening hole formed of the penetrating structure at the supporting part of the reinforcement supporting member, and the second fastening hole of the cover member and the third fastening hole of the base plate, may be formed at the positions corresponding to each other.

Accordingly, because the fastener is simultaneously coupled to the first fastening hole formed at the supporting part of the reinforcement supporting member and the second fastening hole of the cover member from the third fastening hole of the base plate, the base plate, the reinforcement supporting member, and the cover member may be simultaneously coupled by the same fastener.

The fastener may be a structure in which one end is protruded from the cover member such that the fastener is coupled to the battery pack mounting part of a device in the state in which the fastener is inserted and coupled through the fastening holes from the base plate to the cover member side facing thereto.

Accordingly, the fastener may be coupled to the battery pack mounting part from the base plate via the reinforcement supporting member and the cover member, and the battery pack with the further simplified structure may be mounted to the device.

In this case, a height of the fastener protruded from the cover member has a size of 10% to 90% with reference to the height of the supporting part.

If the height of the fastener protruded from the cover member is less than 10% with reference to the height of the supporting part, the fastener is insufficiently protruded, so it is not possible to stably maintain the fixing state in the state in which the battery pack is mounted to the battery pack mounting part.

In contrast, if the height of the fastener protruded from the cover member is over 90% with reference to the height of the supporting part, the fastener is excessively protruded, so there is a problem that the fastener may be damaged due to vibration or impact applied during operation of the device.

A watertight gasket is interposed at both surface parts that are coupled face-to-face to the base plate and the cover member in the supporting part.

Accordingly, through the part where the supporting part is coupled face-to-face to the base plate and the cover member, it is possible to effectively prevent moisture and dirt from flowing in from the outside.

The watertight gasket may be formed of a structure in which the part corresponding to the fastening hole of the supporting part is penetrated.

Accordingly, the fastener coupling the base plate, the cover member, and the supporting part may be easily engaged without interference of the watertight gasket, between the external circumferential surface of the fastener and the interior circumference of the fastening holes of the base plate and the cover member, it is possible to effectively prevent moisture and dirt from flowing in from the outside.

In a specific embodiment, the material of the watertight gasket is not particularly limited as long as it is a material which may exhibit the predetermined sealing force and moisture and contamination penetration preventing effect between the supporting part, the base plate, and the cover member, and in detail, it may be one or more selected from a group including synthetic rubber, natural rubber, silicone resin, and polyvinyl chloride (PVC).

In this case, the synthetic rubber may be at least one selected from a group including styrene-butadiene rubber, polychloroprene rubber, nitrile rubber, butyl rubber, butadiene rubber, isoprene rubber, ethylene propylene rubber, a polysulfide-based rubber, silicon rubber, a fluoride-based rubber, urethane rubber, and acryl rubber.

The mounting space for mounting each of the battery module assemblies may be formed with the recessed structure at one surface of the base plate.

In detail, as two or more battery module assemblies are mounted with the predetermined interval in the separation state from each other at one surface of the base plate and the mounting space for mounting the battery module assemblies is formed of the recessed structure, the independent mounting space via the separation part may be provided.

Accordingly, the separation part between the battery module assemblies is formed of the relatively protruded structure, and as a result, the displacement of each battery module assembly in the battery pack may be suppressed by the separation part positioned between the adjacent battery module assemblies, thereby maintaining the further stable mounting state.

In this case, a recessed depth of the mounting space of the battery module assembly may be formed of a size of 10% to 50% with reference to the height corresponding to the mounting direction of the battery module assembly to prevent a displacement of the battery module assembly.

If the recessed depth of the mounting space of the battery module assembly is formed with a size of less than 10% with reference to the height corresponding to the mounting direction of the battery module assembly, each battery module assembly may not be able to maintain a stable mounting state.

In contrast, if the recessed depth of the mounting space of the battery module assembly is formed with a size of over 50% with reference to the height corresponding to the mounting direction of the battery module assembly, the length from the battery pack mounting part of the device coupled face-to-face through the separation part to the other surface of the base plate facing thereto is excessively large, and accordingly, there is a problem that a limitation of the space and the position to mount the battery pack may be generated.

Each battery module assembly may be formed of a cuboid structure in which a length of an external circumference of one side is relatively larger than the length of the external circumference of another side adjacent to the one side, and the battery module assemblies are mounted on the base plate in the state such that the external circumferences having the relatively larger size face each other.

In detail, each battery module assembly is formed as the plurality of battery cells are arranged, and in this case, the battery module assembly may be formed with the cuboid structure by using ease of an electrical connection structure of the battery cells, ease of application of the limited mounting space of the vehicle, etc.

In this case, the battery module assemblies are mounted on the base plate in a state such that the outer circumferential sides having the relatively larger size face each other, thereby configuring the battery pack with the further compact structure.

However, the mounting structure of the battery module assemblies is not limited thereto, and the battery module assemblies may be mounted or arranged on the base plate in various structures according to the mounting position of the battery pack and the shape of the mounting space.

In a specific embodiment, battery cells configuring one battery module assembly may be coupled in series, and each of the battery module assemblies configuring a module assembly group may be coupled in parallel.

In detail, the battery pack according to the present invention may be mounted to the device such as the vehicle to execute a function supplying the power, accordingly, when the supply of the power for the vehicle suddenly shuts off, a serious accident may be generated.

Accordingly, in the battery pack according to the present invention, as the battery cells configuring one battery module assembly are coupled in series, the desired electrical characteristics are exhibited, and simultaneously the battery module assemblies configuring the module assembly group are coupled in parallel, so even if a part of the battery module assembly fails, the power supply state for the device may be maintained by the rest of the battery module assembly, and as a result, it is possible to prevent the operation of the device from being stopped by suddenly shutting down the power supply of the device, and it is possible to effectively prevent accidents from occurring.

In addition, although the type of the battery cell is not particularly limited, as a concrete example, and it may be a lithium rechargeable battery such as a lithium ion battery, a lithium ion polymer battery, etc. having merits such as high energy density, discharge voltage, output stability, etc.

Generally, the lithium rechargeable battery is composed of a positive electrode, a negative electrode, a separator, and a lithium salt-containing non-aqueous electrolyte.

The positive electrode is manufactured, for example, by coating a mixture of a positive active material, a conductive material, and a binder on a positive electrode current collector and/or an extension current collecting part, and then drying it, and if necessary, a filler may be further added to the mixture.

The positive active material may include layered compounds or compounds substituted with one or more transition metals such as lithium cobalt oxide ($LiCoO_2$) and lithium nickel oxide ($LiNiO_2$); lithium manganese oxides of the chemical formulae $Li_{1+x}Mn_{2-x}O_4$ (wherein x is 0-0.33), $LiMnO_3$, $LiMn_2O_3$, $LiMnO_2$, and the like; lithium copper oxide ($Li_2CuO_2$); vanadium oxides such as $LiV_3O_8$, $LiFe_3O_4$, $V_2O_5$, and $Cu_2V_2O_7$; Ni-site type lithium nickel oxides represented by the chemical formula $LiNi_{1-x}M_xO_2$ (wherein M=Co, Mn, Al, Cu, Fe, Mg, B, or Ga, and x=0.01-0.3); lithium manganese composite oxides represented by the chemical formula $LiMn_{2-x}M_xO_2$ (wherein M=Co, Ni, Fe, Cr, Zn, or Ta, and x=0.01-0.1) or $Li_2Mn_3MO_8$ (wherein M=Fe, Co, Ni, Cu, or Zn); $LiMn_2O_4$ in which some of Li of the chemical formula is substituted with an alkaline-earth metal ion; disulfide compounds; $Fe_2(MoO_4)_3$ and the like, but is not limited thereto.

The conductive material is added at 1 to 30% by weight, based on the total weight of the mixture including the positive active material. This conductive material is not particularly limited as long as it does not cause chemical changes in the battery, and has conductivity, and for example, graphite such as natural graphite or artificial graphite; carbon black such as acetylene black, ketjen black, channel black, furnace black, lamp black, and summer black; conductive fiber such as carbon fiber or metal fiber; metal powder such as carbon fluoride, aluminum, and nickel powder; conductive whiskers such as zinc oxide and potassium titanate; conductive metal oxides such as titanium oxide; conductive materials such as a polyphenylene derivative; and the like may be used.

The binder is a component that assists binding of the active material and the conductive material and the like, and binding for the current collector, and is generally added at 1 to 30% by weight, based on the total weight of the mixture including the positive active material. The example of this binder may include polyfluorovinylidene, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene butadiene rubber, fluorine rubber, various copolymers, and the like.

The filler is a component for suppressing the expansion of the positive electrode, is optionally used, and is not particularly limited as long as it does not cause chemical changes in the battery and is a fibrous material, and for example, olefin-based polymers such as polyethylene and polypropylene, or fibrous materials such as glass fiber and carbon fiber, may be used.

The negative electrode is manufactured by coating the negative electrode active material on the negative electrode current collector and/or the extension current collecting part, and drying it, and if necessary, the components as described above may be optionally further included.

The negative electrode active material may include, for example, carbon such as hard carbon and graphite-based carbon; metal composite oxides such as $Li_xFe_2O_3$ ($0 \leq x \leq 1$), $Li_xWO_2$ ($0 \leq x \leq 1$) and $Sn_xMe_{1-x}Me'_yO_z$ (Me: Mn, Fe, Pb, Ge; Me': Al, B, P, Si, groups 1, 2, and 3 elements of the periodic table, a halogen; $0<x \leq 1$; $1 \leq y \leq 3$; $1 \leq z \leq 8$); lithium metal; a lithium alloy; a silicon-based alloy; a tin-based alloy; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylenes Li—Co—Ni-based materials; and the like.

The separator is interposed between the positive electrode and the negative electrode, and an insulating thin film having high ion permeability and mechanical strength is used. The separator has a pore diameter of generally 0.01-10 μm, and a thickness of 5-130 μm. As this separator, for example, olefin-based polymers such as chemical resistant and hydrophobic polypropylene, a sheet or non-woven fabric made of glass fiber or polyethylene, and the like are used. In the case that a solid electrolyte such as a polymer is used as the electrolyte, the solid electrolyte may also serve as the separator.

Also, as one detailed example, to improve the safety of the battery of a high energy density, the separator and/or the separation film may be an organic/inorganic composite porous SRS (Safety-Reinforced Separator).

The SRS is manufactured by using an inorganic material particle and a binder polymer as an active layer component on a polyolefin-based separator substrate, and has a pore structure included in the separator substrate itself and a uniform pore structure formed by an interstitial volume between the inorganic material particles as the active layer component.

When using an organic/inorganic composite porous separator, compared with a general separator, there is a merit that an increase of the battery thickness depending on swelling during a formation process may be suppressed, and in a case of using a polymer that is gelable during impregnation of a liquid electrolyte solution as the binder polymer component, the polymer may be simultaneously used as an electrolyte.

Also, because the organic/inorganic composite porous separator may exhibit an excellent adherence characteristic by a content adjustment of the inorganic material particle and the binder polymer as the active layer component in the separator, there is a feature that the battery assembly process may be carried out easily.

The inorganic material particle is not specifically restricted as long as it is electrochemically stable. That is, the inorganic material particle used in the present invention is not specifically restricted as an oxidation and/or a reduction reaction is not generated in an operation voltage range (e.g., 0-5 V based on Li/Li+) of the applied battery. Particularly, when using the inorganic material particle having an ion transmitting capacity, since it is possible to increase the ion conductivity within the electrochemical device to produce a performance improvement, it is preferable that the ion conductivity is as high as possible. Also, when the inorganic material particle has a high density, it is not only difficult to be dispersed during coating, but there is also a problem that the weight is increased during the battery manufacturing, so it is preferable that the density is as small as possible. Also, when using an inorganic material having a high dielectric constant, the inorganic material contributes to an increase of a dissociation degree of an electrolyte salt within the liquid electrolyte, for example a lithium salt, such that the ion conductivity of the electrolyte solution may be improved.

A lithium salt-containing non-aqueous electrolyte is formed of a polar organic electrolyte solution and a lithium salt. As the electrolyte solution, a non-aqueous-based liquid electrolyte solution, an organic solid electrolyte, an inorganic solid electrolyte, etc. are used.

As the non-aqueous-based liquid electrolyte solution, for example, an aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydroxyfuran, 2-methyl tetrahydrofuran, dimethyl sulfoxide, 1,3-dioxolane, formamide, dimethylformamide, dioxolane, acetonitrile, nitromethane, formic acid methyl, acetic acid methyl, phosphoric acid triester, trimethoxy methane, dioxolane derivative, sulfolane, methyl sulfolane, 1,3-dimethyl-2-imidazolidinone, a propylene carbonate derivative, a tetrahydrofuran derivative, ether, propionic acid methyl, ethyl propionate, etc. may be used.

As the organic solid electrolyte, for example, polyethylene derivatives, polyethylene oxide derivatives, polypropylene oxide derivatives, phosphate ester polymers, poly agitation lysine, polyester sulfide, polyvinyl alcohol, to polyfluorovinylidene, polymers including an ionic dissociation group, and the like may be used.

As the inorganic solid electrolyte, for example, nitrides, halides, sulfides, or the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, $Li_3PO_4$—$Li_2S$—$SiS_2$, etc. may be used.

The lithium salt is a material which is readily soluble in the non-aqueous electrolyte, and for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carbonic acid lithium, 4-phenyl boric acid lithium, imide, and the like may be used.

Further, for the purpose of improving charge and discharge characteristics, flame retardancy, and the like, for example, pyridine, triethylphosphite, triethanolamine, cyclic ether, ethylene diamine, n-glyme, triamide hexaphosphate, nitrobenzene derivatives, sulfur, quinoneimine dyes, N-substituted oxazolidinone, N,N-substituted imidazolidine, ethylene glycol dialkyl ether, ammonium salts, pyrrole, 2-methoxy ethanol, aluminum trichloride, and the like may be added to the non-aqueous electrolyte solution. In some cases, for imparting incombustibility, a halogen-containing solvent such as carbon tetrachloride and ethylene trifluoride may be further included, and for improving high temperature storage characteristics, carbon dioxide gas may be further included.

The present invention also provides a device including the above battery pack, and the device may be one selected from a group consisting of an electric vehicle, a hybrid electric vehicle, or a plug-in hybrid electric vehicle.

That is, the battery pack according to the present invention may be used as the power source of the device such as the vehicle, and in this case, the battery pack in the device may be the structure mounted to be positioned under the frame of the vehicle, in detail, it may be the structure mounted on the bottom of the frame at the position corresponding to a driver's seat and a passenger's seat of the vehicle.

Accordingly, because the battery pack is not mounted on the inner space such as a trunk of the vehicle, the inner space may be utilized more efficiently, and it is possible to eliminate or minimize the restriction for the mounting position in the device such as the vehicle.

The other configurations of the above-described devices are well-known in the art such that a detailed description thereof will be omitted in the present specification.

DETAILED DESCRIPTION OF THE EMBODIMENTS

Hereinafter, the present invention is further described with reference to the drawings according to the embodiments of the present invention, but the scope of the present invention is not limited thereto.

Figure 1:
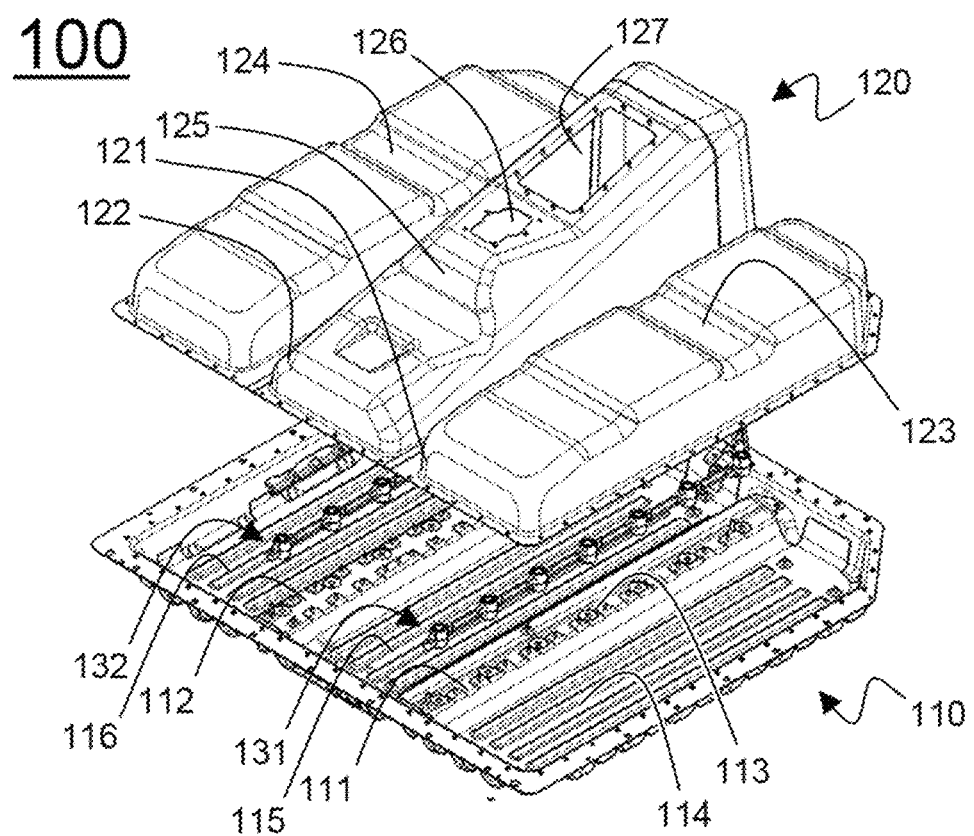
FIG. 1 is an exploded perspective view schematically showing a structure of a battery pack according to an exemplary embodiment of the present invention.

FIG. 1 is an exploded perspective view schematically showing a structure of a battery pack according to an exemplary embodiment of the present invention.

Referring to FIG. 1, a battery pack 100 includes a base plate 110, a cover member 120, and two reinforcement supporting members 131 and 132.

The base plate 110 is formed with a sheet-shaped structure in which mounting spaces 114, 115, and 116 excluding separation parts 111 and 112 between battery module assemblies are recessed in a lower surface direction so that three battery module assemblies are mounted in a separated state from each other with a predetermined interval therebetween.

The separation parts 111 and 112 of the battery module assemblies are formed with a partition structure that is protruded with a predetermined height in the cover member 120 direction from the base plate 110 so that two reinforcement supporting members 131 and 132 are respectively positioned.

Accordingly, the mounting spaces 114, 115, and 116 of the battery module assemblies are mutually divided by the separation parts 111 and 112, therefore, a displacement of each of the battery module assemblies mounted in the battery pack 100 is suppressed, thereby improving the structural stability.

A through hole 113 is formed in the separation parts 111 and 112 so that a fastener may be inserted and coupled to the part corresponding to the supporting part of the reinforcement supporting members 131 and 132.

The cover member 120 is formed of a structure in which an external circumferential surface corresponds to the shape of the battery pack mounting part of the device and simultaneously an interior circumference corresponds to the external circumferential surface of the battery module assembly group, and in detail, is formed of a structure in which the parts 121 and 122 corresponding to the separation parts 111 and 112 between the battery module assemblies are recessed so that the battery module assemblies are respectively divided.

The cover member 120 includes parts 123 and 124 that are additionally further recessed at the part corresponding to the upper surface of the battery module assemblies positioned at both sides by corresponding to the battery pack mounting part of the device having various exterior shapes, as well as parts 121 and 122 corresponding to the separation parts 111 and 112 between the battery module assemblies.

Accordingly, the battery pack 100 may be stably mounted and fixed to the battery pack mounting part having the various shapes such as a frame lower surface of the vehicle.

The cover member 120 includes an inclination part 125 formed with a structure corresponding to the battery pack mounting part of the device at the part covering the upper surface of the battery module assembly positioned at the center.

Accordingly, the inclination part 125 of the cover member 120 as the structure corresponding to the battery pack mounting part of the device may configure the exterior of the battery pack and simultaneously provide a space on which an electric connection device and safety apparatuses such as a BMS may be mounted at the upper surface of the battery module assembly.

Holes 126 and 127 are formed at the part corresponding to the electric connection device and the safety apparatuses that are mounted at the upper surface of the battery module assembly in the inclination part 125 of the cover member 120.

Accordingly, during repair or inspection of the electric connection device and the safety apparatuses, even if the battery pack 100 is not completely dismantled, the repair or inspection may be carried out more easily through the holes 126 and 127 formed in the inclination part 125 of the cover member 120.

The two reinforcement supporting members 131 and 132 are respectively positioned at the separation parts 111 and 112 between the battery module assemblies on the base plate 110 and are coupled face-to-face to the base plate and the cover member 120, thereby stably supporting the mounting state of the cover member 120 for the base plate 110.

Figure 2:
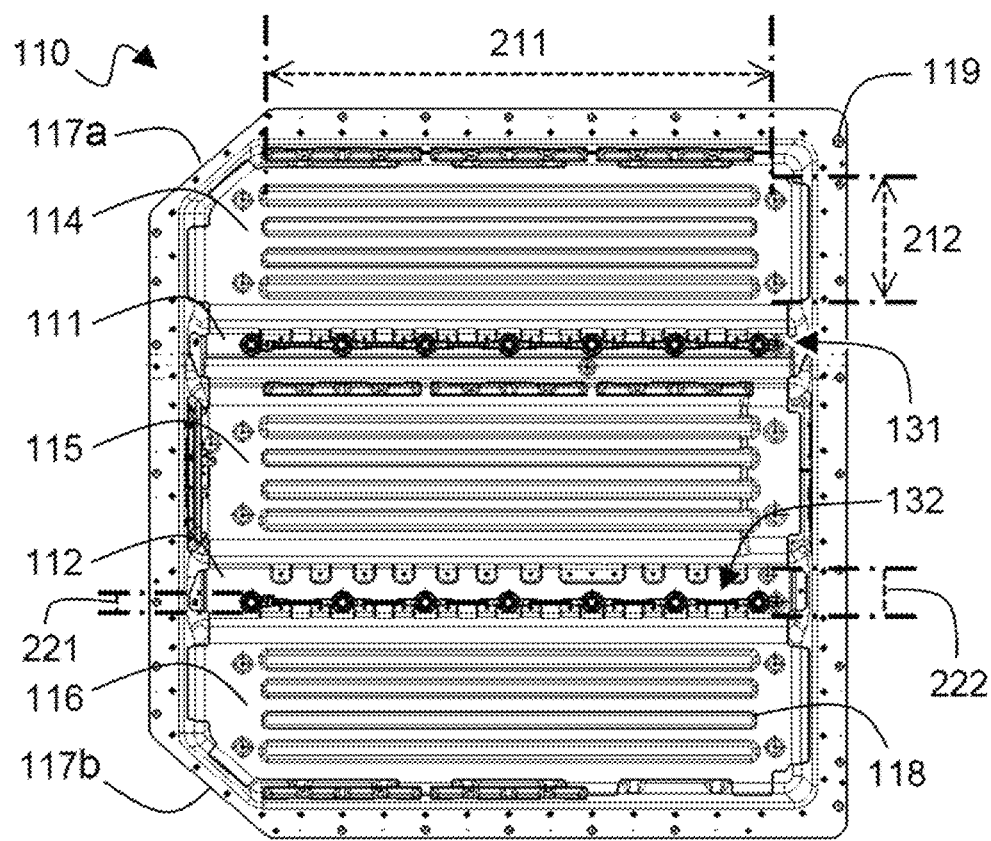
FIG. 2 is a top plan view schematically showing a structure of a base plate to which a reinforcement supporting member of FIG. 1 is mounted.

FIG. 2 is a top plan view schematically showing a structure of a base plate to which a reinforcement supporting member of FIG. 1 is mounted;

Referring to FIG. 2, three battery module assembly mounting spaces 114, 115, and 116 are formed at the upper surface of the base plate 110, and the reinforcement supporting members 131 and 132 are respectively positioned and mounted at the separation parts 111 and 112 between the battery module assembly mounting spaces 114, 115, and 116.

The battery module assembly mounting spaces 114, 115, and 116 are formed with a structure in which a length 211 of the outer circumferential side of one side is relatively larger than a length 212 of the outer circumferential side of another side adjacent to the one side so that the battery module assembly with a cuboid structure is formed.

A plurality of reinforcing beads 118 protruded to be convex in the battery module assembly mounting direction are formed in the battery module assembly mounting parts 114, 115, and 116 in order to reinforce rigidity.

A width 222 of the separation parts 111 and 112 is made with a size of about 200% with respect to a width 221 of the reinforcement supporting members 131 and 132.

Accordingly, the electrical connection members to electrically connect the battery modules or the battery module assemblies may be easily accommodated at the separation parts 111 and 112 between the battery module assembly mounting spaces 114, 115, and 116.

A plurality of fastening holes 119 for mounting to the device are formed at the outer circumferential side of the base plate 110, and inclination parts 117a and 117b are formed corresponding to the shape of the battery pack mounting part at two corner parts.

Figure 3:
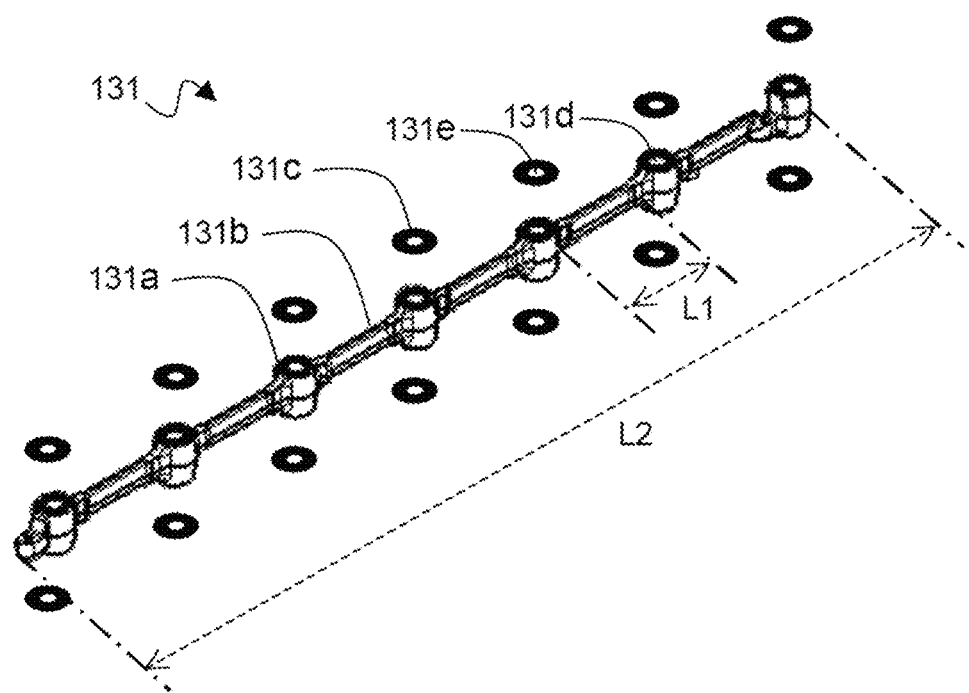
FIG. 3 is a schematic view schematically showing a structure of a reinforcement supporting member of FIG. 1.

FIG. 3 is a schematic view schematically showing a structure of a reinforcement supporting member of FIG. 1.

Referring to FIG. 3, the reinforcement supporting member 131 has a structure in which a connection beam 131b is continuously connected between supporting parts 131a, and the supporting parts 131a and the connection beam 131b are made with an integral structure.

The supporting parts 131a are formed with a cylindrical structure in which both surfaces facing each other are respectively coupled face-to-face to the recessed interior circumference part of the cover member and the compartment space between the battery cell assemblies on the base plate.

A fastening hole 131d is formed as a penetration structure to which the fastener is coupled at both surfaces of the supporting parts 131a, which are coupled face-to-face to the cover member and the base plate.

A watertight gasket 131c is positioned between the cover member and the base plate at both surfaces of the supporting part 131a.

The watertight gasket 131c is formed with the same circular shape as a horizontal cross-sectional shape of the supporting parts 131a, and is formed with a structure in which a part corresponding to the fastening hole 131d of the supporting parts 131a is penetrated.

A length L1 of the connection beam 131b connected between the supporting parts 131a is formed with a size of about 10% with respect to the entire length L2 of the reinforcement supporting member 131.

Figure 4:
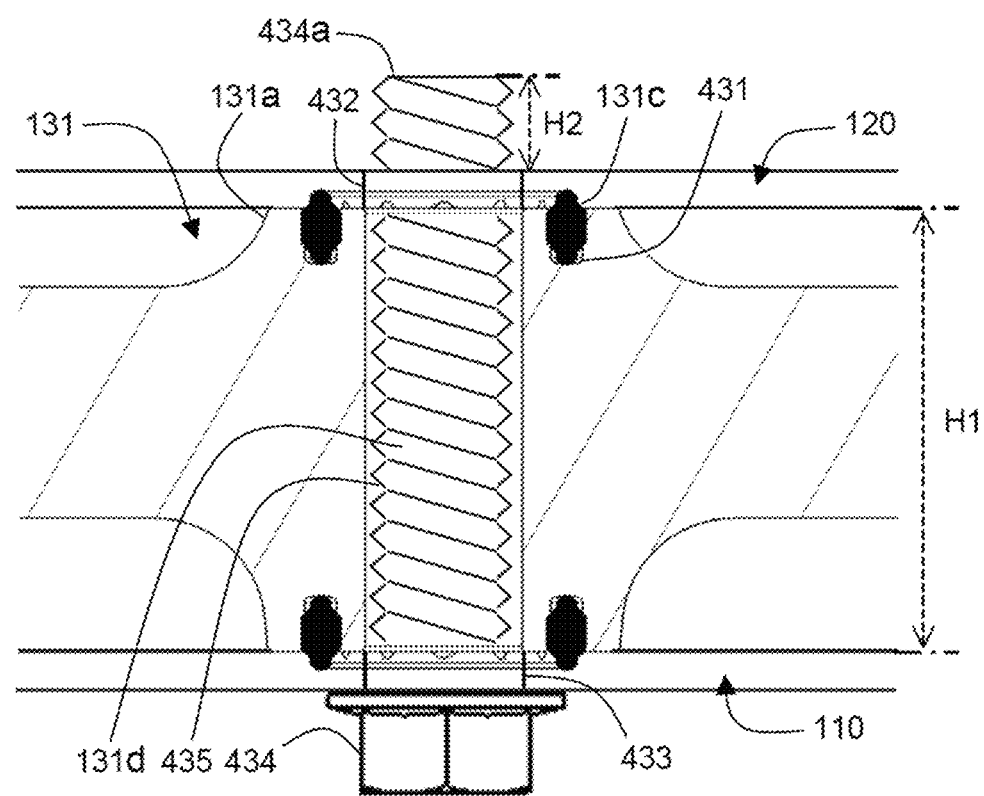
FIG. 4 is a vertical cross-sectional view schematically showing a structure of a reinforcement supporting member that is mounted to a battery pack of FIG. 1.

FIG. 4 is a vertical cross-sectional view schematically showing a structure of a reinforcement supporting member that is mounted to a battery pack of FIG. 1.

Referring to FIG. 4, a gasket mounting groove 431 to which the watertight gasket 131c is mounted is continuously formed around the fastening hole of the supporting parts 131a at both surfaces of the supporting part 131a of the reinforcement supporting member 131 facing the cover member 120 and the base plate 110.

The watertight gasket 131c is protruded by a predetermined height from both surfaces of the supporting part 131a in the state in which the watertight gasket 131c is mounted to the gasket mounting groove 431 and exerts a predetermined elastic force, thereby exerting a desired sealing force between the cover member 120 and the base plate 110.

The fastening hole 131d of the supporting part 131a of the reinforcement supporting member 131 is the penetration structure, and a groove 435 of a screw structure is formed at the inner surface thereof.

A second fastening hole 432 and a third fastening hole 433 are respectively formed at the parts of the cover member 120 and the base plate 110 corresponding to the first fastening hole 131d of the supporting parts 131a of the reinforcement supporting member 131.

Accordingly, one fastener 434 is inserted and coupled with the screw structure through the fastening holes 432, 433, and 131d in the direction to the cover member 120 from the base plate 110, and accordingly, the base plate 110, the reinforcement supporting member 131, and the cover member 120 may be stably coupled and maintained.

One end 434a of the fastener 434 is protruded by the height H2 of about 20% from the cover member 120 with reference to the height H1 of the supporting part 131a.

Accordingly, the base plate 110 of the battery pack, the cover member 120, and the reinforcement supporting member 131 are coupled by the same fastener 434 and simultaneously may be mounted to the battery pack mounting part of the device, thereby configuring the battery pack with the simpler and lighter weight structure.

Figure 5:
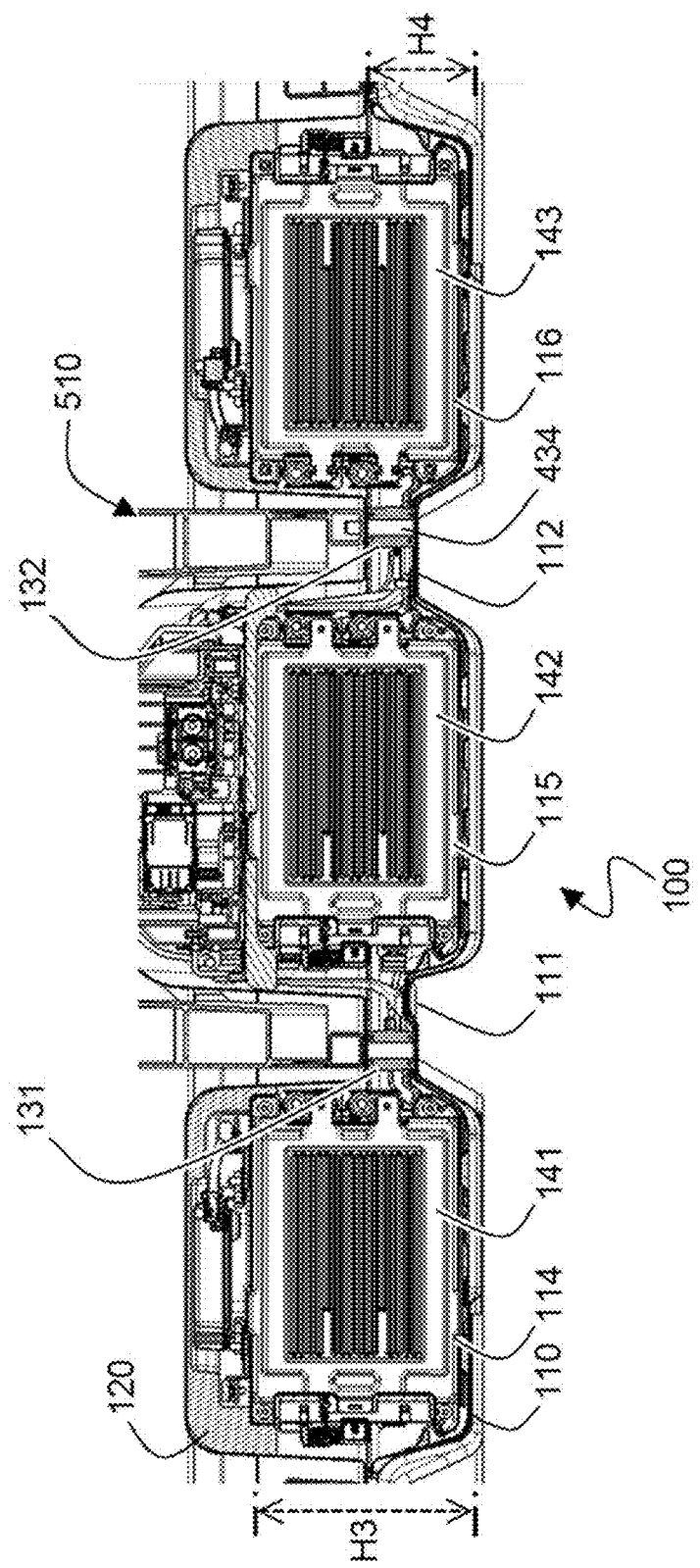
FIG. 5 is a vertical cross-sectional view schematically showing a mounting structure of a battery pack of FIG. 1 for a device.

FIG. 5 is a vertical cross-sectional view schematically showing a mounting structure of a battery pack of FIG. 1 for a device.

Referring to FIG. 5, the mounting spaces 114, 115, and 116 of the base plate 110 for mounting battery module assemblies 141, 142, and 143 are formed of a structure that is recessed with the depth H4 of about 50% in the lower surface direction based on the height H3 of the battery module assemblies 141, 142, and 143 corresponding thereto.

Accordingly, the separation parts 111 and 112 between the mounting spaces 114, 115, and 116 are relatively protruded in the upper surface direction and are coupled face-to-face to the recessed interior circumference part of the cover member 120 via the reinforcement supporting members 131 and 132 interposed therebetween.

A lower frame 510 of the vehicle as the battery pack mounting part of the device is positioned at the upper surface of the inside recessed part of the cover member 120.

In the state in which the fastener 434 is insert and coupled to the cover member 120 side of the base plate 110, one end is protruded from the cover member 120 to be coupled to the lower frame 510 of the vehicle.

Therefore, the battery pack 100 can be mounted in a close contact structure corresponding to the shape of the lower frame 510 of the vehicle, and in various operating environments of the vehicle, it is possible to maintain the combination state of the battery pack 100 more stably.

Those of ordinary skill in the art to which the present invention belongs will be able to make various applications and modifications within the scope of the present invention.

INDUSTRIAL APPLICABILITY

As described above, as the battery pack according to the present invention is configured to be mounted in the state in which the external circumferential surface of the cover member faces the battery pack mounting part of the device, the battery pack may be configured to be mounted under the device such as the vehicle, and accordingly, in the device, the space required for the mounting of the battery pack may be minimized, thereby overcoming the limitation for a mounting position of the battery pack and confirming maximization of space utilization of the device.

What is claimed is:

1. A battery pack, comprising:
a base plate including one surface on which two or more battery module assemblies respectively having a plurality of battery cells arranged therein are mounted in a separated state from each other with a predetermined interval therebetween;
a cover member mounted on one surface of the base plate while enclosing the battery module assemblies; and
a reinforcement supporting member positioned at a separation part between the battery module assemblies while supporting a mounting state of the cover member for the base plate, the reinforcement supporting member including at least two supporting parts and a connection beam extending between the at least two supporting parts,
wherein a height of each supporting part in a vertical direction is greater than a height of the connection beam in the vertical direction,
wherein a space is provided between a portion of the connection beam and the base plate.

2. The battery pack of claim 1, wherein
a mounting space for mounting each of the battery module assemblies is formed of thoas a recessed structure at one surface of the base plate.

3. The battery pack of claim 2, wherein
a recessed depth of the mounting space of the battery module assembly is formed of a size of 10% to 50% with reference to the height corresponding to the mounting direction of the battery module assembly to prevent a displacement of the battery module assembly.

4. The battery pack of claim 1, wherein each battery module assembly is formed of a cuboid structure in which a length of an external circumference side of one side is relatively larger than the length of the external circumference side of another side adjacent to the one side, and the battery module assemblies are mounted on the base plate in the state in which the external circumferences having the relatively large size face each other.

5. The battery pack of claim 1, wherein
battery cells configuring one battery module assembly are coupled in series, and the battery module assemblies configuring a module assembly group are coupled in parallel.

6. The battery pack of claim 1, wherein
the battery cell is a lithium rechargeable battery.

7. A device comprising:
a battery pack mounting part; and
the battery pack of claim 1,
wherein the battery pack is mounted in a state in which an external circumferential surface of the cover member faces the battery pack mounting part.

8. The device of claim 7, wherein
the device is selected from a group consisting of an electric vehicle, a hybrid electric vehicle, or a plug-in hybrid electric vehicle.

9. The device of claim 7, wherein
the external circumferential surface of the cover member is formed of a structure corresponding to a shape of the battery pack mounting part of the device.

10. The device of claim 9, wherein
the cover member is formed of a structure in which a part corresponding to a separation space between the battery module assemblies is recessed inside so that the battery module assemblies are separated from each other.

11. The device of claim 10, wherein
the part of the battery pack mounting part is coupled face-to-face to an interior circumference of the part where the cover member is recessed inside.

12. The device of claim 7, wherein
the battery pack is mounted to the battery pack mounting part by a fastener that is inserted and coupled from the base plate.

13. The device of claim 12, wherein
the fastener is coupled to the battery pack mounting part through at least one supporting part of the two supporting parts of the reinforcement supporting member and the cover member from the base plate.

14. The device of claim 12, wherein
in the reinforcement supporting member, each supporting part has an upper surface and a lower surface opposite each other, the upper surface being coupled face-to-face to a recessed interior circumference part of the cover member, and the lower surface being coupled face-to-face to the separation part of the battery cell assemblies on the base plate.

15. The device of claim 14, wherein
in the at least one supporting part of the two supporting parts of the reinforcement supporting member, a first fastening hole where the fastener is coupled to both surfaces that are coupled face-to-face to the cover member and the base plate is formed with a penetrating structure.

16. The device of claim 15, wherein
a second fastening hole and a third fastening hole are respectively formed at the part of the cover member corresponding to the first fastening hole of the at least one supporting part of the two supporting parts of the reinforcement supporting member and the part of the base plate.

17. The device of claim 16, wherein
in the state in which the fastener is inserted and coupled through the fastening holes from the base plate to the cover member side facing thereto, one end is protruded from the cover member such that the fastener is coupled to the battery pack mounting part.

18. The device of claim 17, wherein
a height of the fastener protruded from the cover member has a size of 10% to 90% with reference to the height of the supporting part.

19. The device of claim 15, wherein
a watertight gasket is interposed at the first and second surface parts that are coupled face-to-face to the base plate and the cover member in the supporting part.

20. The device of claim 19, wherein
the watertight gasket is formed of a structure in which the part corresponding to the fastening hole of the supporting part is penetrated.

21. The device of claim 19, wherein
the material of the watertight gasket is one or more selected from a group including a synthetic rubber, a natural rubber, a silicone resin, and a polyvinyl chloride (PVC).

22. The device of claim 21, wherein
the synthetic rubber is at least one selected from a group including styrene-butadiene rubber, polychloroprene rubber, nitrile rubber, butyl rubber, butadiene rubber, isoprene rubber, ethylene propylene rubber, a polysulfide-based rubber, silicon rubber, a fluoride-based rubber, urethane rubber, and acryl rubber.

* * * * *